United States Patent [19]

Benton

[11] Patent Number: 4,523,087
[45] Date of Patent: Jun. 11, 1985

[54] TRANSACTION VERIFICATION SYSTEM USING OPTICAL COUPLING DATA COMMUNICATION LINK

[76] Inventor: William M. Benton, 2888 NE. 25th Ct., Fort Lauderdale, Fla. 33305

[21] Appl. No.: 451,169
[22] PCT Filed: Apr. 7, 1981
[86] PCT No.: PCT/US81/00450
 § 371 Date: Dec. 7, 1982
 § 102(e) Date: Dec. 7, 1982
[87] PCT Pub. No.: WO82/03484
 PCT Pub. Date: Oct. 14, 1982
[51] Int. Cl.³ .............................................. G06F 15/30
[52] U.S. Cl. .................................... 235/379; 235/380; 235/432; 340/825.33
[58] Field of Search ........................ 235/379, 432, 380; 364/406, 408, 519, 189; 340/825.33

[56] References Cited

U.S. PATENT DOCUMENTS

| | | | |
|---|---|---|---|
| 3,648,021 | 3/1972 | Rogers | 340/825.33 X |
| 4,001,550 | 1/1977 | Schatz | 235/379 |
| 4,007,355 | 2/1977 | Moreno | 235/379 |
| 4,053,735 | 10/1977 | Foudos | 340/825.33 X |
| 4,277,837 | 7/1981 | Stuckert | 364/900 |

*Primary Examiner*—David L. Trafton
*Attorney, Agent, or Firm*—Lowe King Price & Becker

[57] ABSTRACT

A system for providing authorization to complete a requested transaction comprises a portable verification device (20) carried by each user to be inserted into a receptacle (34) at a point of transaction for authorization verification. The portable device (20) comprises a housing (22) containing data processing and storage circuitry, a keyboard (24) for manually entering identification and transaction data, and a display. An optical transceiver (70) exposed through the housing (22) establishes a bidirectional optical data link between the portable device (20) and a corresponding optical transceiver (80) in the receptacle (34). The optical data link is preferably in the non-visible wave length range, e.g. infrared, to make the system immune to ambient visible light and to mask optical data from the user. The portable device can be used either in an off-line mode, wherein transaction data, such as account balance and user restrictions, are stored in memory within the device and transactions are approved based upon keyboard entered data and data stored in device (20), or in an on-mode, wherein transactions are authorized based upon keyboard entry of the personal identification number and data coupled between the portable device and a host computer via the optical channel. Vouchers (30) are imprinted by a thermal print head (56) within device (20) following authorization.

10 Claims, 11 Drawing Figures

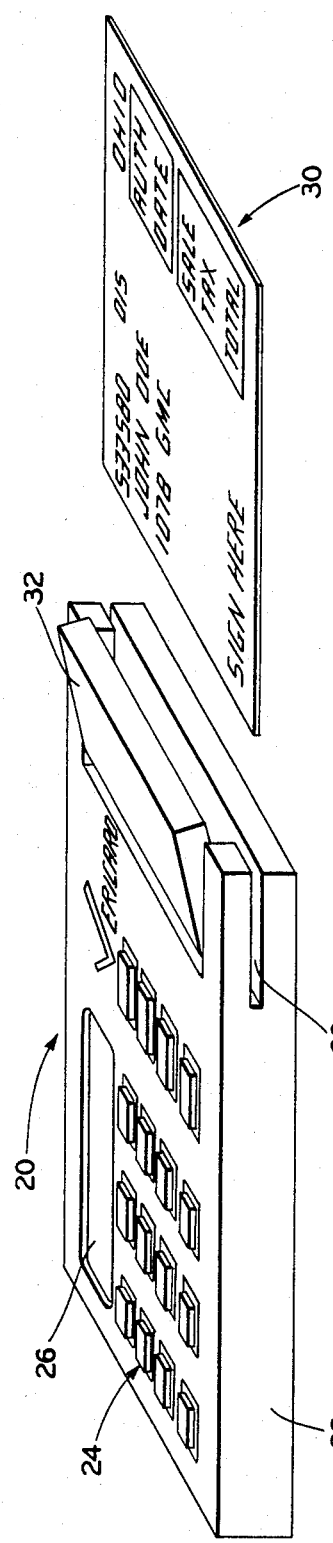
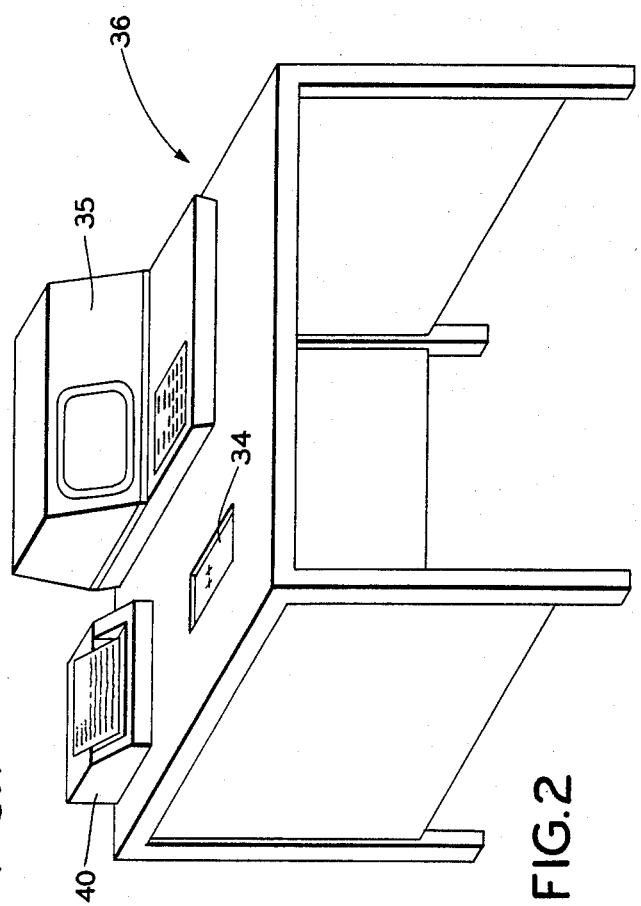
FIG.1
FIG.2

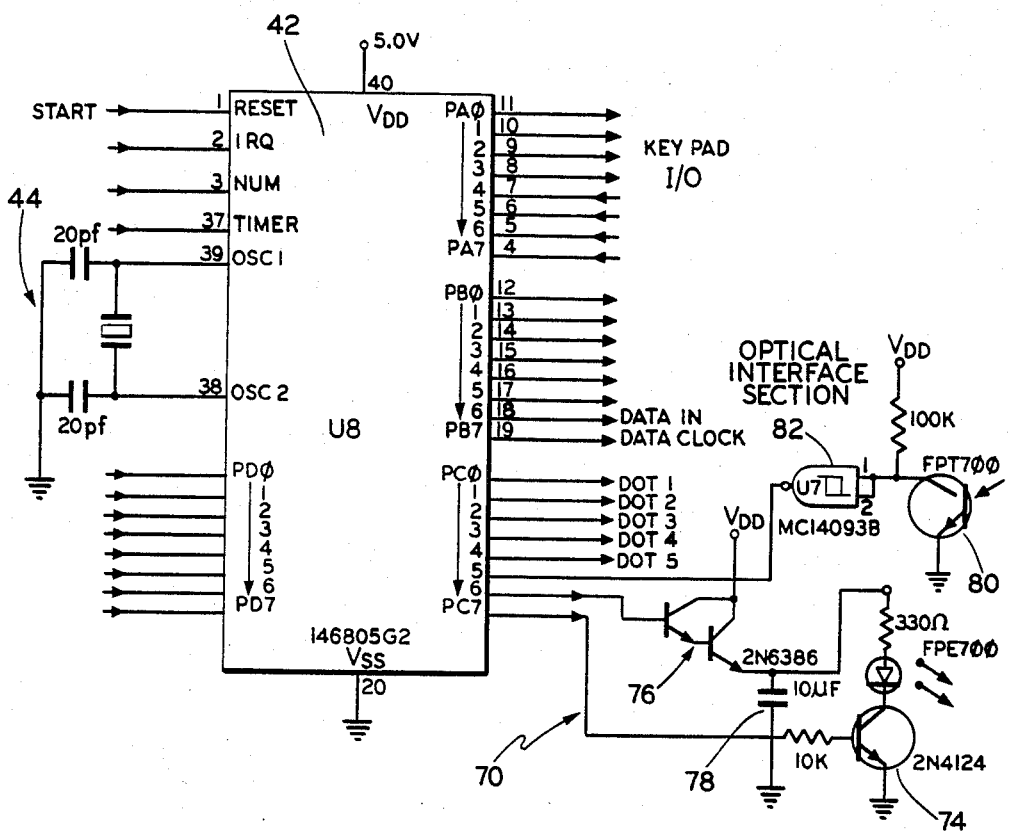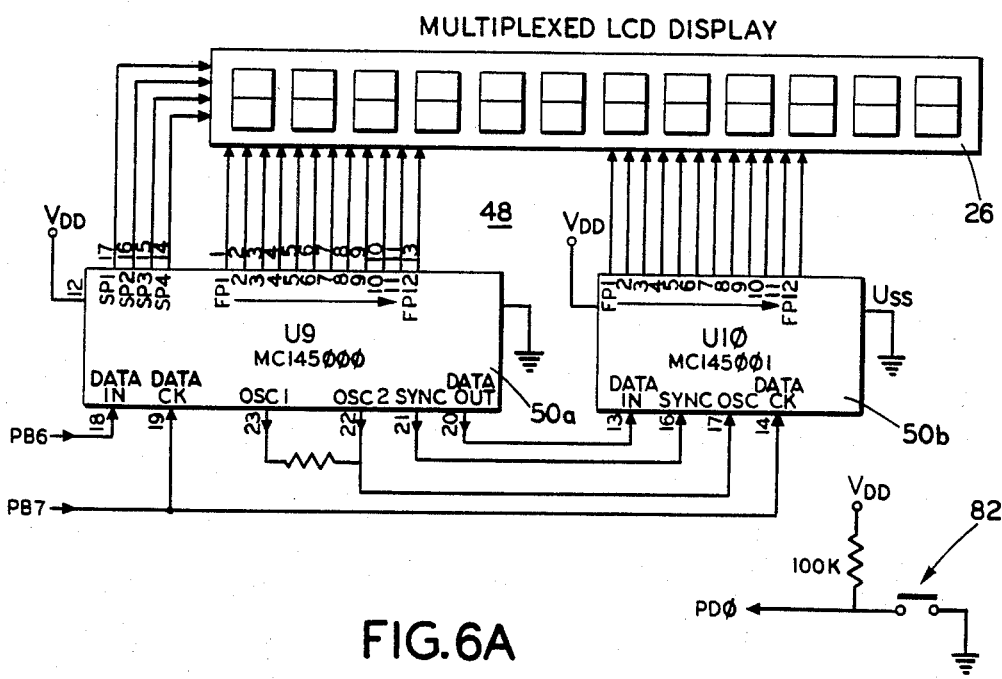
FIG. 6A

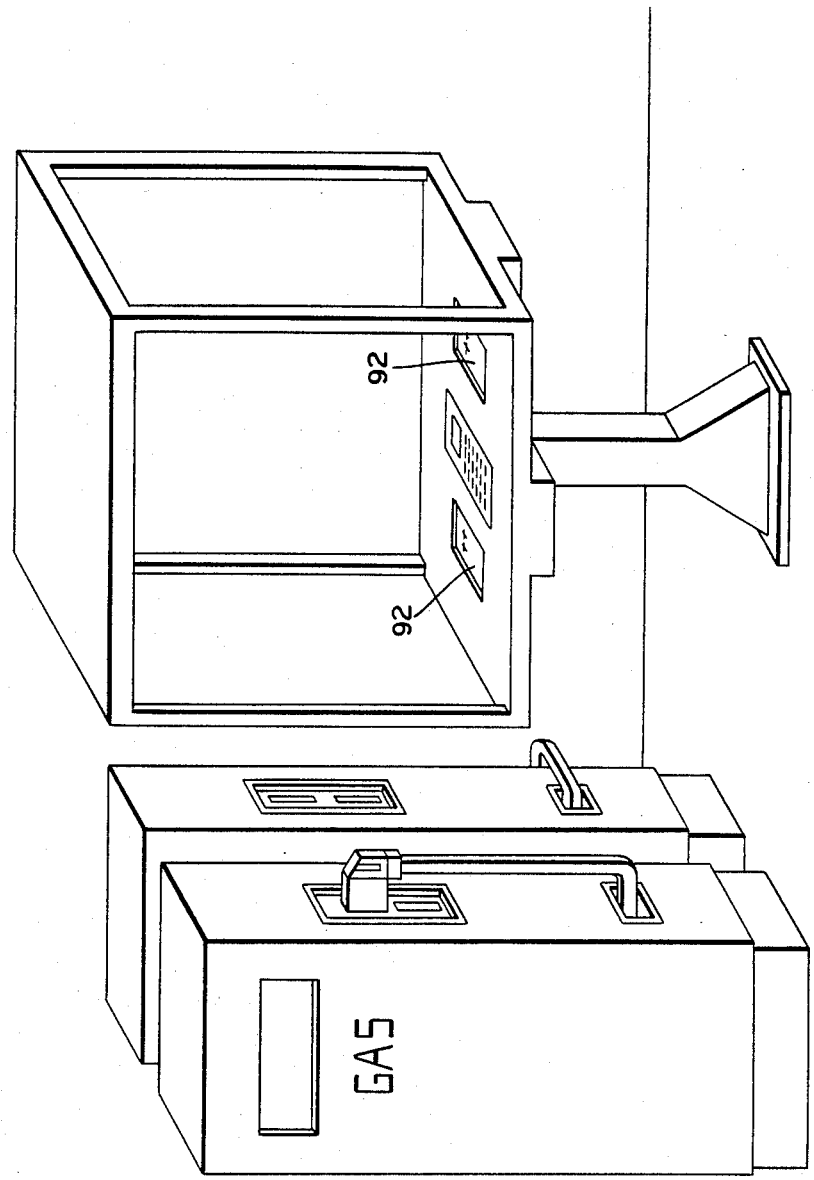

TRANSACTION VERIFICATION SYSTEM USING OPTICAL COUPLING DATA COMMUNICATION LINK

TECHNICAL FIELD

The present invention relates generally to verification systems for environments such as electronic funds transfer, restricted zone entry and medical record logging, and particularly toward such systems involving a portable verification device usable alternatively in on-line and off-line modes of operation.

BACKGROUND ART

Microprocessor based verification systems have recently been developed using a portable verification device carried by each user to be presented at a point of transaction for verification. These devices are constructed and programmed to respond to keyboard entered identification data, termed a personal identification number (PIN), and transaction data to determine whether an individual is an authorized user of the system to complete a requested transaction and whether the amount of the transaction is within his or her credit limit. Verification is generally performed off-line, wherein substantially all data processing occurs locally, i.e., within the portable device. In other systems that predated the development of portable verification devices, verification is performed on-line by coupling data over the telephone lines to a host computer that may be located at a bank or authorizing institution, for example. There are, however, no systems of which I am aware that use a portable verification device operated alternatively off-line or on-line.

Alternative on-line or off-line operation of portable verification devices provides several advantages. Even if verification is substantially performed off-line, necessary to provide a second level of verification by accessing the contents of account data or other data at the host location. For example, if an off-line verification routine indicates an uncertain or marginal authorization, it may be necessary to obtain additional credit information not available at the point of transaction. Further, it is necessary, for optimum security, to have access to data that is so recently received by the authorizing institution that the data has not yet been provided at the point of transaction. Thus, by accessing the host from time to time, the portable unit can be updated with current information.

Accordingly, one object of the invention is to provide a verification system including a central or host computer, a number of remote terminals and a portable verification device carried by each user, wherein the device is operative either off-line or on-line to provide transaction verification.

Another object is to provide a transaction verification system including a portable verification device carried by each user that is capable of receiving keyboard entered data, storing transaction and identification data, performing computations and displaying results.

Another object of the invention is to provide a transaction verification system including a portable device carried by each user that provides a running record of transactions, interrogates the record to determine whether a requested transaction falls within authorization limits and prints a voucher signifying completion of the requested transaction.

On-line communication to a central computer is generally made via telephone either conversationally by the vendor or digitally through an acoustic coupler. In either case, it is time consuming to establish contact between the vendor and personnel at the host or acoustically to couple digital data to the telephone lines. Furthermore, the user (customer) is made aware that a verification at the central or host computer is being undertaken. It is preferable, however, to establish comunication between a portable verification device and the central computer in a confidential manner, that is, in a manner wherein the customer is not aware that verification is being made and wherein verification is made without delay.

Another object of the invention, therefore, is to provide automatic on-line verification between a portable verification device and central computer.

Another object is to provide on-line verification of transaction data without knowledge by the vendee and without delay to the transaction.

Another object is to provide a verification system that is not limited to any particular environment, e.g., that can be used in electronic funds transfer, secured area access, medical data inventorying and others.

DISCLOSURE OF INVENTION

A transaction verification system comprises a central computer that may be located at an authorizing institution, a number of remote verification terminals and a portable verification device carried by each user. The verification device includes data processing and storage circuitry within a housing, together with a keyboard for manually entering data. A display driven by the circuitry provides visual information, such as account balance and transaction amount. A first optical transceiver exposed through the housing establishes bidirectional data communication in bit serial format to the central computer. Each remote terminal comprises a console including a receptacle for receiving verification device. Within the receptacle, a second optical transceiver is positioned in optical resolution with the first optical transceiver in the portable device. During each transaction, the portable device is seated in the receptacle so that the two transceivers establish optical, bidirectional transmission link.

A recess is formed in one end of each portable verification device to receive a voucher. A print head positioned within the recess prints an authentication code on the voucher following completion of a requested transaction. The print head, which is preferably a thermal printer, prints an encoded array of dots to establish that the voucher has in fact been printed upon by an authorized verification device and is therefore eligible for payment to the vendor.

Still other objects and advantages of the present invention will become readily apparent to those skilled in this art from the following detailed description, wherein we have shown and described only the preferred embodiment of the invention, simply by way of illustration of the best modes contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a perspective view of portable verification device, in accordance with the invention, receiving a voucher to be imprinted;

FIG. 2 is a perspective view of a remote verification console, including a receptacle for receiving a verification device of the type shown in FIG. 1;

FIGS. 6A and 6B are detailed schematic diagrams of the circuitry contained in the portable verification device of FIG. 1;

FIG. 9 is a perspective view of a gasoline vending station including a console having receptacles to receive a pair of verification devices to authorize purchase transactions.

BEST MODE FOR CARRYING OUT THE INVENTION

Figure 5:
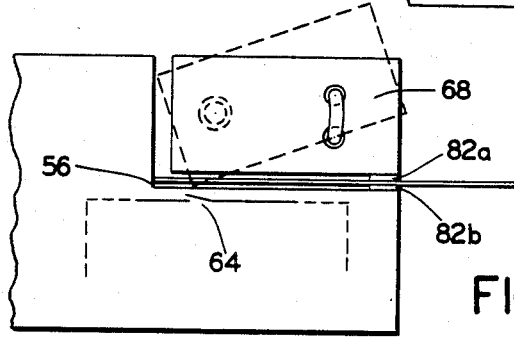
FIG. 5 is a side view of a portion of the portable verification device illustrating the operation of the printer head.

Referring to FIG. 1, a portable verification device 20, in accordance with the invention, comprises a housing 22 containing battery operated microprocessor based signal processing and storage circuitry (FIG. 6), a keyboard 24 to enable manual entry of identification and transaction data and a display 26 for displaying circuit generated data, such as account balance or instruction messages. A recess 28 formed in one end of the device housing 22, is adapted to receive voucher 30 to be imprinted upon by a print head 56 (see FIG. 5) positioned within recess 28 beneath pivotally mounted print bar 32. The bar 32 is spring-biased to be maintained in the open position shown in FIG. 1; imprinting of data onto a voucher 30 is enabled by manually depressing the bar 32, as shown in FIG. 5, to cause the internal print head 56 to imprint data onto the voucher. The portable verification device 20 is generally of a type disclosed in pending patent application Ser. No. 166,689 filed on July 2, 1980 now U.S. Pat. No. 4,341,951.

As an overview, the verification device 20 may be used off-line in the manner described in the earlier application to maintain a running account balance and adjust the balance to account for an approved transaction keyboard entered at 24. The account balance is displayed in display 26, and voucher 30 is authenticated by the printer 56 within end recess 28. As an example of the manner by which verification unit 20 may be used in accordance with the earlier application, assuming that a purchase transaction is to be made between a customer and vendor, the customer presents his verification device 20 to the vendor to determine whether the purchase is authorized. The customer initiates the transaction by keyboard entering a personal identification number (PIN) known only to the customer. The personal identification number is compared to a corresponding number stored in memory within the verification device 20, and if there is correspondence, the customer is authorized to keyboard enter the transaction amount. The amount of the transaction is now compared with an account balance stored in memory within the device 20. If the amount of the account balance is greater than the amount of the transaction, the transaction is authorized. The vendor, after recording the transaction on voucher 30, which may have been imprinted with embossments from a credit card to identify the purchase, inserts the voucher 30 into recess 28 of the housing 22. The vendor now manually depresses print bar 32 which imprints data on the voucher 30 for authentication and which simultaneously updates the stored account balance to reflect the transaction. The account balance is now displayed in display 26.

Of particular significance, the operation of the verification device 20 to this point is off-line, that is, transaction authorization is made by the verification device 20 without any external data obtained, for example, from a central or host computer through communication lines.

In accordance with the present invention, transaction verification may be performed on-line as well as off-line. The verification unit device 20 is positioned within a cradle or receptacle 34 (see FIG. 2) at a point of transaction station or console 36. The personal identification number is keyboard entered by the customer, followed by entry of the transaction amount. In the event that the vendor requests transaction verification from the authorizing institution, he will keyboard enter instructions to an intelligent terminal 38 to cause the verification device 20 to communicate with the authorizing institution on-line via optical coupling, as shall be described in detail below. As another possibility, during verification, the device 20 may require additional information from the authorizing institution, such as current account balance. This may occur, for example, in response to marginal credit identified by data in the device 20, an account balance that is very close in amount to the transaction amount, or excessive recent usage. Thus, the verification device 20 will be controlled to go on-line to request and obtain particular information concerning the customer from the authorizing institution. Particular data may be returned by the authorizing institution to be displayed on the screen of terminal 35, to be displayed on the display 26 of verification device 20 or to be printed by printer 40.

Figure 6B:
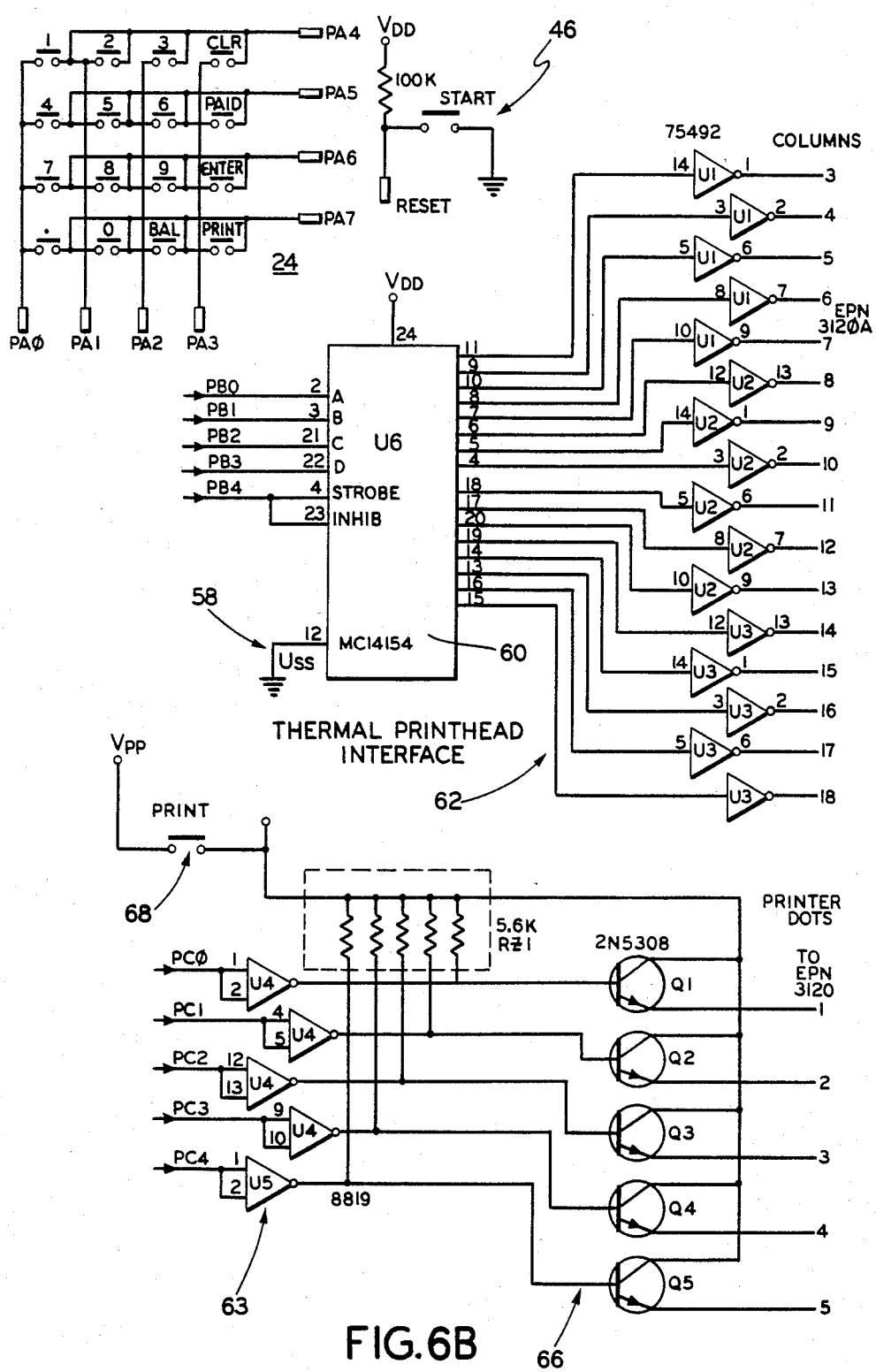

Referring to FIG. 6, data processing and storage circuitry contained within the housing 22 of verification device 20 comprises a conventional microprocessor 42, which is preferably a low current drain type such as the Motorola 146805G2, powered from a battery source at terminal $V_{DD}$ and timed by a conventional crystal oscillator 44. The microprocessor 42 preferably includes input and output ports PA0–PA7, PB0–PB7, PC0–PC7 and PD0–PD7, an internal random access memory (RAM) circuit, mask programmed memory (ROM), a system clock synchronized to oscillator 44 and an interval timer. The contents of the microprocessor 42 are not shown for simplicity.

Keyboard 24 comprises a matrix of normally open switches connected between various input and output ports of the microprocessor 42, as shown in the diagram of FIG. 6. The keyboard switches are arranged in a 16-switch, four row by four column array. Interrogation and debouncing of the original keyboard switches are performed by microprocessor 42 using conventional software. Scanning of the key switches is provided through an 8-bit directional parallel input/output port contained within the microprocessor. Special function keys are handled through additional bit lines on a secondary parallel input/output port within the microprocessor. The microprocessor 42 is normally in a low current drain, quiescent state that is switched into a normal monitoring state by activation of a start switch 46. The start switch 46, connected to the Reset Terminal 1 of the microprocessor 42, initiates a start up routine to place the microprocessor 42 in a "ready" state.

The output of the microprocessor 42 is supplied to LCD display 26 through conventional LCD driver circuitry 48, which decodes the data and multiplexes the data to be applied to the display 26 in a conventional manner. The display multiplexing is provided using standard integrated circuits 50a, 50b, which may be, respectively, Motorola MC145000 and MC145001 integrated circuit devices. These commercially available circuits generate all the necessary timing waveforms to the display 26 entered serially to the multiplexing devices 50a, 50b.

Figure 7:
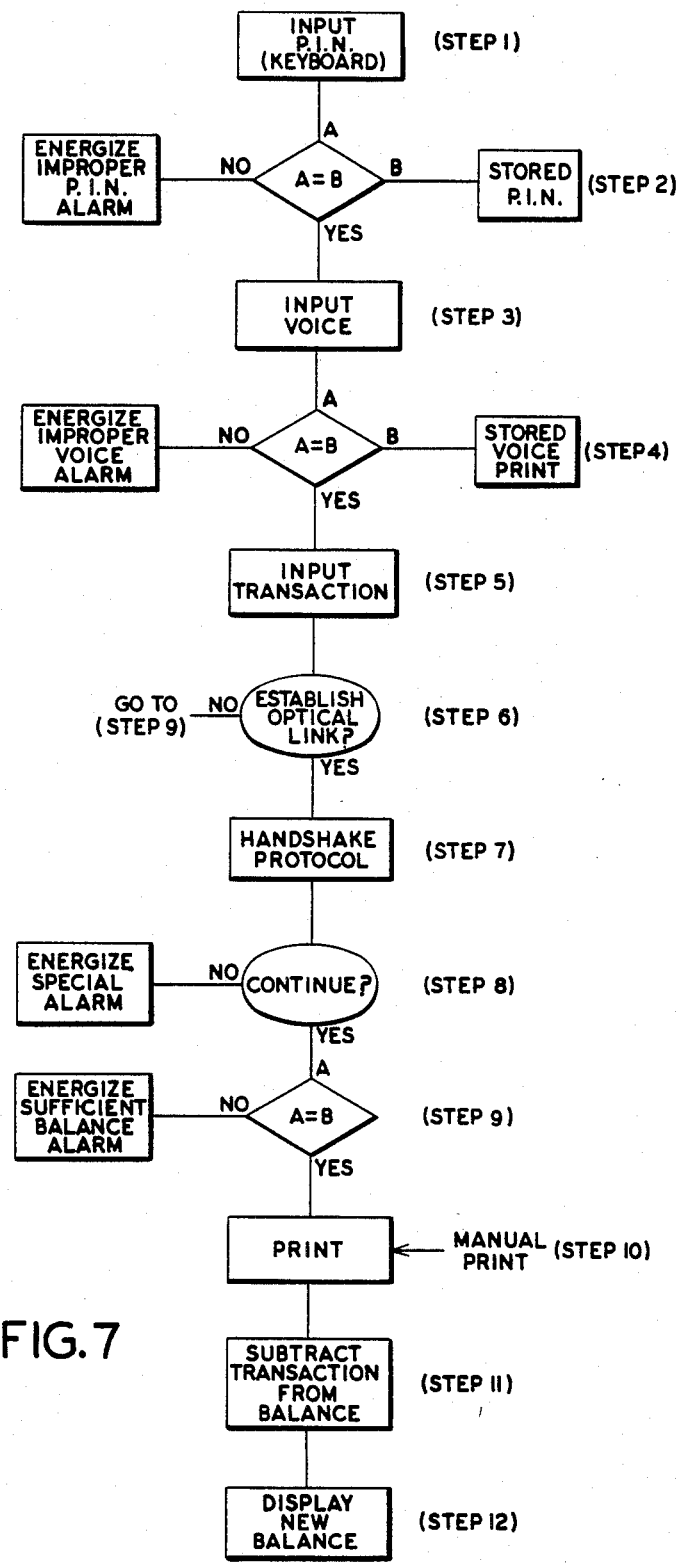
FIG. 7 is a flow chart illustrating the operation of the microprocessor contained in the verification device of FIG. 1.

Data generated by microprocessor 42 is also supplied to a thermal print head 56 (see FIG. 6) through conventional thermal print head interface circuitry 58, shown in FIG. 7. The print head may be, for example, an EPN 3120A print head manufactured by Texas Instruments. The print head is preferably of a type comprising 80 discrete dots arranged in a 16 column by 5 row array. Addressing of the array is accomplished by first selecting the individual row to be printed through a latched, 4 line to 16 line decoder 60, such as a Motorola MC14154 decoder through driver stages 62. The 5-dot pattern applied to each successive column is controlled by microprocessor 42 through driver amplifiers 63 and output transistors 66. The data applied to voucher 30 by thermal print head 56 may be encoded in any of several encoding schemes, such as binary coded decimal, which is machine-readable or readable by personnel.

Print switch 68 which enables the output transistor 66 is manually controlled by print bar 68 (see FIG. 6). Preferably, the switch 68 is located at the stationary portion of end recess 26 in housing 22, to be operated upon manual depression of the bar 32. Thus, no current is applied to the print head 56 except upon depression of print bar 32 to minimize total current drain and thereby conserve battery power.

A second switch 82 positioned inside recess 28 of device housing 22 detects the presence of a voucher 30. The switch 82 has portions 82a, 82b located on facing surfaces of print bar 68 and the stationary housing portion 86 to detect electrical continuity between switch portions 82a, 82b when bar 32 is depressed. If there is continuity, no voucher 30 is present in the recess 28. The switch 82 is connected in circuit with microprocessor 42 to control printer head 56 to be energized only when a voucher 30 is present in the recess 26 as well as only when the print bar 32 is manually depressed.

Of particular importance, data are transmitted and received by microprocessor 42 via an optical transceiver 70 (FIG. 7) comprising a light emitting diode (LED) 72 driven by driver transistor 74. The driver transistor 74 is in turn controlled by Darlington transistor stage 76 that is driven by output terminal PC6 of microprocessor 42. The driver transistor 74 is controlled by output terminal PC7 of the microprocessor 42. The signals on the two output terminals PC6 and PC7 for controlling the LED 72 are synchronized to each other to successively supply charging current to capacitor 78 through Darlington stage 76 and then to discharge the capacitor through LED 72 and driver transistor 74 to develop a light pulse.

Phototransistor 80, responsive to incoming light pulses, has an output supplied to input terminal PC5 of microprocessor 42 through a Schmitt trigger 82 which may be, for example, a Motorola MC14093B integrated circuit. The Schmitt trigger circuit 82 shapes the leading and trailing edges of pulses generated by phototransistor 80 in response to incoming optical data to eliminate "bounce" in the pulse waveform.

Figure 3:
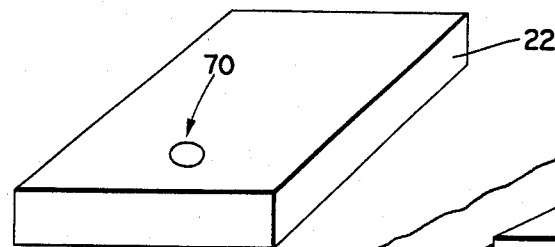
FIG. 3 is a bottom view of the verification device shown in FIG. 1, illustrating an optical transceiver.
Figure 4:
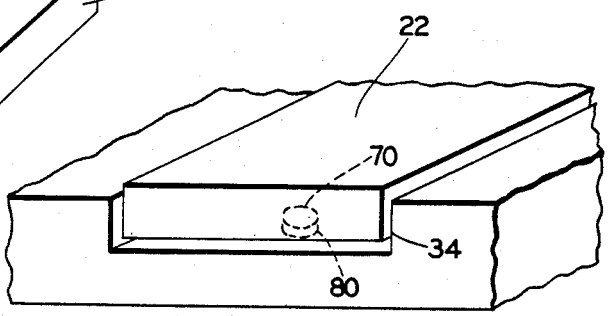
FIG. 4 is a partial view showing a verification device seated within the receptacle of a verification console to establish optical coupling with a transceiver positioned in the receptacle.

LED transmitter 72 and phototransistor receiver 80 are preferably operative in the infrared frequency range to minimize interference by ambient visible lighting and to enhance security since optical communication will not be visible to the user. Thus, the optical transceiver 70 is exposed through verification device housing 22 at the lower surface of the housing (see FIG. 3). With reference to FIG. 4, the transceiver 70 is positioned in housing 22 relative to corresponding transceiver 80 within the receptacle 24 such that the two transceivers 70, 80 are in optical alignment with each other. The output of optical transceiver 80, which is generally similar in structure to transceiver 70, is coupled to intelligent terminal 38 (see FIG. 2) and to the telephone lines (not shown) to establish signal communication over the telephone lines to an authorizing institution or host computer. Since the transceivers 70 and 80 are immediately adjacent each other, as shown in FIG. 4, and are blocked from viewing by the customer by the verification device housing 22, the customer is never aware of particular data being communicated on-line by the verification device 20 or whether the verification device 20 is in fact on-line. Thus, in practice, verification consoles 36 at some locations, such as grocery stores wherein purchases tend to be a relatively low dollar value and high volume, may be always off-line, whereas consoles at other locations may be always on-line. As to other locations, the console may be on-line or off-line, depending upon circumstances, i.e., manually controlled to be on-line by the vendor or automatically controlled to be on-line via programming within the verification device 20. In any case, the customer will never know whether communication is established between the console at the point of transaction and the authorizing institution; this is believed to reduce the likelihood of fraud.

Figure 8:
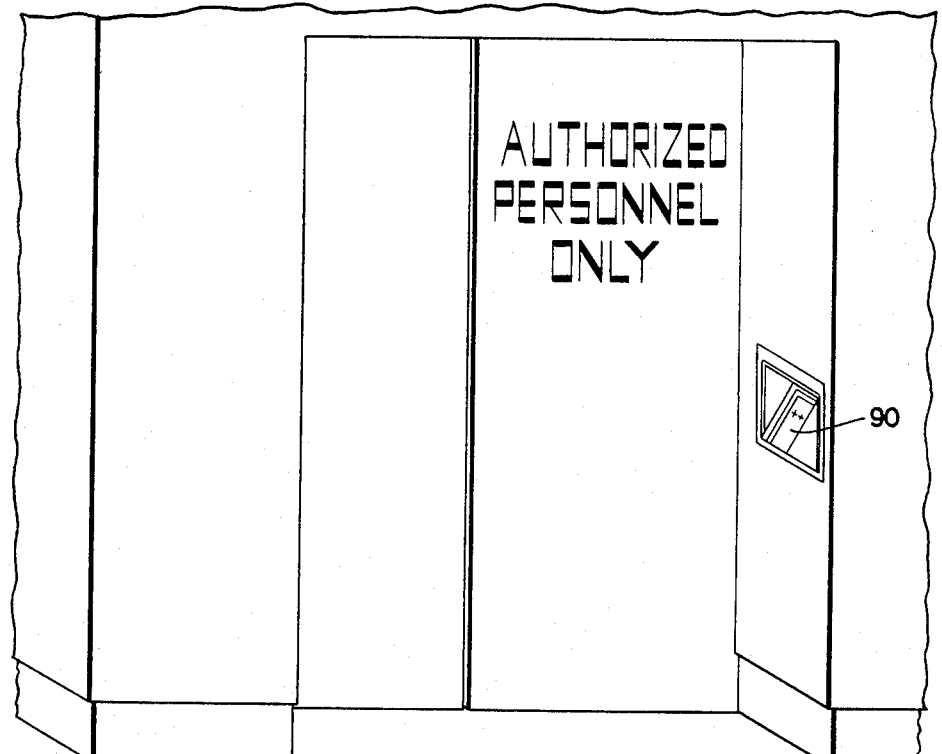
FIG. 8 is a perspective view of a secured area having a verification device receptacle, in accordance with one aspect of the invention, used as an electronic key.

With reference to FIG. 8, typical operation of verification device 20 in a commercial environment is described in detail. The customer initially seats his verification device into console receptacle 34, and keyboard enters his personal identification number (Step 1). The keyboard entered personal identification number is stored in a register within microprocessor 42, and is compared with a corresponding personal identification number stored in another register within the microprocessor. This latter personal identification number is programmed into a read-only memory (ROM) within the microprocessor 42 at the time the verification device 20 is issued. As another possibility, the pretermined number may be programmed into non-volatile random access memory (RAM) so that the personal identification number can be periodically changed by returning the verification device 20 to the authorizing institution from time to time or by reprogramming the RAM on-line during a verification cycle at a point of transaction.

In any event, the keyboard entered personal identification number and stored identification number are compared with each other to determine whether the individual present the verification device 20 at the point of transaction is authorized to make transactions.

At another level of security, the personal identification number keyboard entered during Step 1 may be internally unscrambled in accordance with a predetermined or quasi-randomly determined algorithm to correspond to the stored personal identification number. If there is a positive comparison between the keyboard entered personal identification number and the stored identification number (Step 2), the operating sequence of microprocessor 42 proceeds to Step 3; otherwise, an improper personal identification number alarm is energized to enable the customer to attempt another keyboard entry of the personal identification number. In practice, only a predetermined number, e.g., 3, attempts per customer, are permitted to prevent an unauthorized user from attempting to determine the personal identification number by trial and error.

As another level of security (Step 3), the customer may provide to the system a voice "print" by speaking into a microphone, for example, to be compared with a corresponding voice print stored in memory (Step 4). This also enables the vendor to visually compare the voice print obtained from the speaking voice of the customer with the stored voice print, both displayed on the screen of terminal 38. If there is a positive comparison, either by the microprocessor 42 or by the vendor, the operating sequence of microprocessor 42 advances to Step 5; otherwise, an improper voice alarm is energized. The voice verification steps 3 and 4 provide an additional level of security to the system; it is to be understood, however, that steps 3 and 4 are optional.

In accordance with Step 5, the amount of a transaction is now keyboard entered by the customer. In the event that this system is to go on-line to establish communication with a host computer, as determined in Step 6, the operating sequence of microprocessor 42 advances to Step 7; otherwise the sequence skips to Step 9. The optical link is established manually by the vendor who may, for example, be insecure as to the authenticity of a transaction or as to the current account balance associated with the device 20. The vendor may, in practice, place verification device 20 on-line randomly as a spot check; this will further discourage fraud by unauthorized individuals who may misappropriate the verification devices 20.

The verification device 20 is programmed to go on-line to obtain express authorization to complete a transaction from a host computer randomly or based upon predetermined criteria, such as a relatively low account balance or excessive recent transaction usage. The verification device 20 may further be programmed to go on-line during certain types of transactions that are more likely to be the subject of fraud, such as purchase of jewelry. In any event, in the event that the verification device 20 is controlled to go on-line, transceiver 70 is controlled by microprocessor 42 to establish communications with the host computer via an optical communication link at the receptacle 34. Initially, LED 72 will be controlled to generate a serial stream of data to the host computer which in turn will respond by generating another serial data stream in the form of light pulses to be received by phototransistor 80 and recognized by the microprocessor 42. The microprocessor 42 will in turn control LED 72 to generate additional data to the computer, and so forth, in a procedure known as "handshaking." When sufficient data has been transferred between the microprocessor 42 and the verification device 20 and the host computer, substantive data will be exchanged between the verification device and computer to perform such tasks as updating the account balance stored in the microprocessor 42 with current account information maintained by the host computer, revising the stored personal identification number in the microprocessor 42, instructing the vendor via the screen at terminal 38 to obtain additional information or identification from the customer, identifying an unauthorized user from "hot card" data, etc.

If the transaction following on-line communication with the host computer is authorized, the microprocessor 42 will continue, at Step 9, to determine verification of the requested transaction. In accordance with Step 9, if the requested transaction is less than or equal to the current balance stored in microprocessor 42, the microprocessor will proceed to Step 10; otherwise, an alarm will be energized indicating that there are insufficient funds to support the requested transaction. Assuming, however, that the transaction is authorized at Step 9, the vendor inserts the voucher 30 into recess 28 and manually depresses print bar 32 to thermally print the authorization onto the voucher. By manually depressing the print bar, switch 68 is closed, indicating to microprocessor 42 that a print cycle is requested. Switch 82 positioned between print bar 32 and stationary housing portion 86 identifies the presence of voucher 30, as described above. This is provided by the insulating properties of the voucher 30, formed preferably of thermal paper, which insulates the contacts 86a, 86b located on the inner surfaces of print bar 32 and stationary housing portion 86. If switches 68 and 82 indicate that a voucher 30 is properly in position within recess 82 and that a print cycle is requested by depressing print bar 32, microprocessor 42 controls the thermal print head interface circuitry 58 to supply data generated by the microprocessor 42 to the thermal print head 56 to authenticate the voucher 30 (Step 10).

The microprocessor 42 now subtracts the amount of the transaction from the transaction balance stored in memory (Step 11) and displays the new balance on display 26 (Step 12).

Thus, verification device 20 can be used in either an on-line or off-line mode of operation to verify the authenticity of the bearer of the device 20, to verify that the requested transaction is within credit limits and to print an authentication code on a voucher. Because the verification device 20 is portable, microprocessor controlled and keyboard operated, the device will have application in countless environments such as in product or gasoline dispensing (see FIG. 9), zone security (FIG. 8) and medical data logging (FIG. 10).

In accordance with FIG. 8, for example, the verification device 20 may be programmed to function as an "electronic key," that is, to enable the user to gain access to a restricted zone by seating his verification device 20 into the receptacle 90 and keyboard entering his personal identification number. Of particular importance, because optical communication is established between the verification device 20 and a host computer through the receptacle 90, data may be transferred between the computer and verification device. Such data may include a record of individuals gaining access to the secured zone at various times of day. Data stored in the verification device may also identify the location of the user at various times of the day.

In accordance with gasoline distribution, shown in FIG. 9, the verification device 20 may be seated in receptacles 92 which, besides authorizing and accounting for gasoline dispensing transactions, may control dispensing and may be interfaced with a flowmeter within the gasoline pumps to monitor gasoline comsumption.

Figure 10:
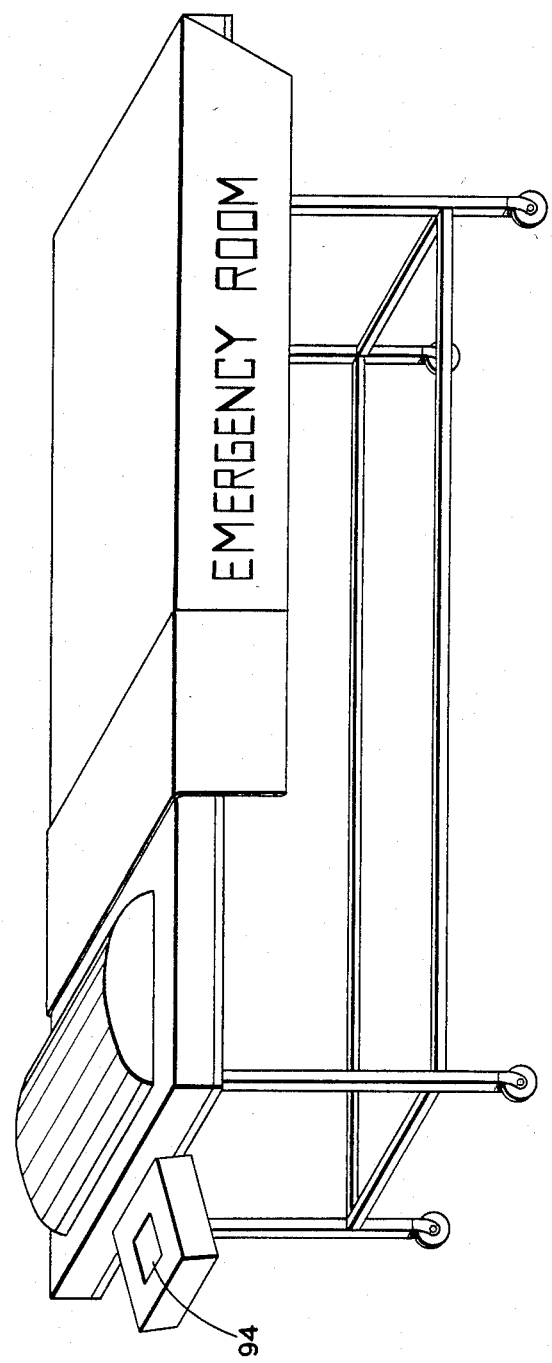
FIG. 10 is a perspective view of a verification console applied in a health care environment for maintaining patient records.

In accordance with medical data logging, shown in FIG. 10, the verification device 20 may be seated within receptacle 94 and used to maintain a running inventory of medication administered to a particular patient. In addition, the device 20 may be programmed to contain information concerning identity of attending physicians, the dates of examinations, medicines administered, allergies, insurance and other information.

Because verification device 20 is microprocessor based, a serial number stored in the microprocessor can be generated to provide an identification of the verification unit. For example, a miniature transceiver capable of handling binary data may be provided in the device 20 and interfaced to additional input/output ports of the microprocessor 42. Thus, the location and identity of any verification unit 20 may be obtained by polling stations positioned within the receiving range of the verifier telemetry circuitry. It is thereby possible to ascertain the location of a stolen verification device 20, which will serve as a deterrent to theft.

Further, because the verification device 20 is microprocessor based, the device may be interfaced with the standard telephone lines to provide secure communication between different verification devices or between verification devices and host computers via binary data or voice cryptology. Thus, binary data generated by the verifier 20 may be processed through a conventional encryption module using the standard data encryption algorithm, published by the National Bureau of Standards and contained within FIPS Publication 46, available from the U.S. Department of Commerce. The verification device 20 may be programmed to supply the 56-bit key required by the algorithm agreed upon between two users in a given network, thus allowing total security of voice communication. The encrypted binary data may be transmitted over the telephone lines using suitable demodulation and decryption at the receiving end. Thus, device 20 may be used to establish confidential communication over the telephone lines. This is especially valuable in connection with electronic funds transfer over the telephone lines from distant banks.

As another possibility, the verifier device 20 may be used in a barter mode, wherein the verifier is programmed to accept data from a similar verifier, and funds are electronically transferred directly between cooperating devices. Fees and sales taxes may be automatically deducted from the verifier when it is returned to the authorizing institution, from time to time, for periodic account update. The device 20 may be programmed to provide a real time calendar clock that is required to be periodically updated at specified times.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

I claim:

1. A system for determining whether a requested transaction is authorized, comprising
   a portable verification device to be carried by a user, said device comprising a housing, data processing and storage circuit means inside said housing; a keyboard for providing monodirectional first transaction data to said circuitry and a first optical transceiver exposed through said housing for providing bidirectional second transaction data to said circuitry;
   a console at a point of transaction location, including a receptacle for receiving said verification device, a second optical transceiver within said receptacle position to establish an optical communication link with said first optical transceiver, said receptacle including means for maintaining said first and second optical transceivers in proper optical registration with each other and
   means responsive to keyboard entered data and stored data for establishing transaction authorization data on said optical link.

2. The system of claim 1, wherein said circuit means of said verification device includes means for storing identification data entered by an authorizing institution, first comparator means for comparing keyboard entered identification data with said institution entered identification data and means responsive to said first comparator means for generating a first validation signal.

3. The system of claim 2, wherein said circuit means of said verification device includes means for storing an account balance, second comparator means for comparing keyboard entered transaction data with said stored account balance and means responsive to said second comparator means for generating a second validation signal.

4. The system of claim 1 or 2 or 3 wherein said verification device includes printer means responsive to said circuit means for printing verification data on a voucher.

5. The system of claim 4, wherein said printer means includes a recess formed in said housing for receiving said voucher, and a printer head within said recess positioned to contact said voucher.

6. The system of claim 5 wherein said printer means includes a pivotable bar member defining one side of said recess, electric switch means operated by said bar member and driver means responsive to said switch means and said circuit means for energizing said printer head.

7. The system of claim 6, wherein said printer head is a thermal printer.

8. The system of claim 1, wherein said verification device includes display means exposed through said housing, and means responsive to said circuit means for energizing said display means.

9. The system of claim 1, wherein said first optical transceiver is positioned on a lower surface of said housing and said second optical transceiver is positioned on an exposed surface of said receptacle, said first and second optical transceivers being axially aligned with each other and blocked from view by said housing when said housing is seated within said receptacle.

10. The system of claim 9, wherein said first and second optical transceivers are operative in the infrared frequency range.

* * * * *